US012643080B2

(12) United States Patent
Fernandez et al.

(10) Patent No.: US 12,643,080 B2
(45) Date of Patent: Jun. 2, 2026

(54) OLIGOMERISER WITH AN IMPROVED FEED SYSTEM

(71) Applicant: SABIC Global Technologies B.V., Bergen op Zoom (NL)

(72) Inventors: Ignacio Vic Fernandez, Carretera Cartagena (ES); Fernan Mateos Salvador, Carretera Cartagena (ES); Surya Prakasa Rao Daliparthi, Bangalore (IN)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 685 days.

(21) Appl. No.: 18/081,732

(22) Filed: Dec. 15, 2022

(65) Prior Publication Data

US 2023/0123390 A1 Apr. 20, 2023

Related U.S. Application Data

(62) Division of application No. 16/625,926, filed as application No. PCT/IB2018/054867 on Jun. 29, 2018, now Pat. No. 11,529,602.

(30) Foreign Application Priority Data

Jun. 30, 2017 (EP) .................................... 17382424

(51) Int. Cl.
*B01J 4/00* (2006.01)
*B01F 23/47* (2022.01)
(Continued)

(52) U.S. Cl.
CPC ............... *B01J 4/001* (2013.01); *B01F 23/47* (2022.01); *B01F 27/1131* (2022.01);
(Continued)

(58) Field of Classification Search
CPC .. B01J 19/0066; B01J 4/001; B01J 2204/002; B01J 2204/005; B01F 27/1131
See application file for complete search history.

(56) References Cited

U.S. PATENT DOCUMENTS 3,466,150 A 9/1969 Dietze et al.
3,927,983 A 12/1975 Gordon et al.
(Continued)

FOREIGN PATENT DOCUMENTS

CN 2486202 Y 4/2002
CN 1972982 A 5/2007
(Continued)

OTHER PUBLICATIONS

Machine Translation of JP 2001-019705 (Year: 2001).*
(Continued)

*Primary Examiner* — Lessanework Seifu
(74) *Attorney, Agent, or Firm* — CANTOR COLBURN LLP

(57) ABSTRACT

In an embodiment, a reactor for carrying out a melt transesterification reaction at a reactor temperature of 160 to 300° C. and a reactor pressure of 5 to 200 mbar, comprises a cylindrical tank comprising a top, a side, and a bottom, wherein the bottom is convex, extending away from the top; a stirring shaft disposed within the cylindrical tank along an axis thereof so that it is rotatable from outside of the cylindrical tank; a stirring blade extending from the stirring shaft in the cylindrical tank; a reactant solution inlet located on the bottom; and a reaction solution outlet located on the bottom. The reactor can be used for the polymerization of a polycarbonate oligomer.

7 Claims, 4 Drawing Sheets

(51) Int. Cl.

| | |
|---|---|
| ***B01F 27/1131*** | (2022.01) |
| ***B01F 27/91*** | (2022.01) |
| ***B01J 19/00*** | (2006.01) |
| ***B01J 19/18*** | (2006.01) |
| ***C08G 64/30*** | (2006.01) |
| *B01F 101/00* | (2022.01) |

(52) U.S. Cl.

CPC ........... *B01F 27/91* (2022.01); *B01J 19/0066* (2013.01); *B01J 19/18* (2013.01); *C08G 64/307* (2013.01); *B01F 2101/2204* (2022.01); *B01F 2101/2805* (2022.01); *B01J 2204/002* (2013.01); *B01J 2204/005* (2013.01); *B01J 2219/00168* (2013.01); *B01J 2219/00779* (2013.01); *B01J 2219/1943* (2013.01)

(56) References Cited

U.S. PATENT DOCUMENTS

| | | | | |
|---|---|---|---|---|
| 5,498,688 | A | 3/1996 | Oshino et al. | |
| 6,428,199 | B1 * | 8/2002 | Rupaner | B01J 19/20 366/314 |
| 6,458,916 | B1 | 10/2002 | Yamaguchi et al. | |
| 8,017,713 | B2 | 9/2011 | Takahashi et al. | |
| 8,785,565 | B2 | 7/2014 | Namiki et al. | |
| 2006/0176771 | A1 | 8/2006 | Adams | |
| 2010/0243208 | A1 | 9/2010 | Kar et al. | |
| 2013/0233393 | A1 | 9/2013 | Kageler | |
| 2017/0313790 | A1 * | 11/2017 | Yokoyama | C08F 2/01 |
| 2020/0148819 | A1 | 5/2020 | Daliparthi et al. | |
| 2020/0171452 | A1 | 6/2020 | Fernandez et al. | |

FOREIGN PATENT DOCUMENTS

| | | | | |
|---|---|---|---|---|
| CN | 101185864 | A | 5/2008 | |
| CN | 101642688 | A | 2/2010 | |
| CN | 201880499 | U | 6/2011 | |
| CN | 102580654 | A | 7/2012 | |
| CN | 102702500 | B | 3/2013 | |
| CN | 102675619 | B | 6/2013 | |
| CN | 105252508 | A | 12/2015 | |
| CN | 205833150 | U | 12/2016 | |
| DE | 102012105296 | | 12/2013 | |
| EP | 1657272 | A1 | 5/2006 | |
| EP | 2692768 | A1 | 5/2014 | |
| JP | 5751724 | A | 3/1982 | |
| JP | 07292002 | A | 11/1995 | |
| JP | H09286850 | A | 11/1997 | |
| JP | H10176045 | | 6/1998 | |
| JP | 2001019705 | A * | 1/2001 | |
| JP | 2003138001 | | 5/2003 | |
| JP | 2013213105 | | 10/2013 | |
| JP | 2015108048 | | 6/2015 | |
| JP | 2016079400 | A | 5/2016 | |
| WO | 0246267 | A2 | 6/2002 | |
| WO | 2005105890 | A1 | 11/2005 | |
| WO | 2012156916 | A1 | 11/2012 | |
| WO | 2016023857 | A | 2/2016 | |
| WO | WO-2016047631 | A1 * | 3/2016 | C08G 75/14 |
| WO | 0076657 | A1 | 12/2017 | |

OTHER PUBLICATIONS

"Handbook of Industrial Mixing: Science and Practice"; Wiley—Interscience; 2004; pp. 357-358.

International Search Report; International Application No. PCT/IB2018/054867; International Filing Date: Jun. 29, 2018; Date of Mailing: Oct. 23, 2019; 6 pages.

Written Opinion; International Application No. PCT/IB2018/054867; International Filing Date: Jun. 29, 2018; Date of Mailing: Oct. 23, 2018; 8 pages.

CN Decision of Reexamination issued Jan. 13, 2026 for Chinese Application No. 201880034520.0; 20 pages.

CN Notice of Reexamination issued Oct. 23, 2025 for Chinese Application No. 201880034520.0; 14 pages.

* cited by examiner

OLIGOMERISER WITH AN IMPROVED FEED SYSTEM

CROSS REFERENCE TO RELATED APPLICATIONS

This application claims priority to and the benefit of U.S. application Ser. No. 16/625,926, filed Dec. 23, 2019, which is the National Phase Entry of International Application No. PCT/IB2018/054867, filed Jun. 29, 2018, which claims the benefit of European Patent Application Ser. No. 17/382,424.4, filed Jun. 30, 2017, each of which are incorporated by reference in their entireties herein.

BACKGROUND

Polycarbonate is widely used in many engineering applications as it has excellent mechanical properties, such as impact resistance and heat resistance, and also has excellent transparency. In a typical method that is industrially used for producing polycarbonate, a bisphenol, such as Bisphenol A (BPA), and a carbonate precursor, such as diphenyl carbonate (DPC), are reacted in an ester exchange method in a molten state. This melt polymerization is often referred to as a melt polycondensation process or transesterification process. The resulting polycarbonate can be extruded or otherwise processed, and can be combined with additives such as dyes and UV stabilizers.

The melt polymerization process though can result in polycarbonates having an increased yellowness index. Methods of preparing polycarbonate with increased control of the polymerization are therefore desired.

BRIEF SUMMARY

Disclosed herein is a bottom feed reactor and uses thereof.

In an embodiment, a reactor for carrying out a melt transesterification reaction at a reactor temperature of 160 to 300° C. and a reactor pressure of 5 to 200 mbar, comprises a cylindrical tank comprising a top, a side, and a bottom, wherein the bottom is convex, extending away from the top; a stirring shaft disposed within the cylindrical tank along an axis thereof so that it is rotatable from outside of the cylindrical tank; a stirring blade extending from the stirring shaft in the cylindrical tank; a reactant solution inlet located on the bottom; and a reaction solution outlet located on the bottom.

In another embodiment, a method of melt polymerizing a polycarbonate, comprises adding a precursor solution comprising a polycarbonate precursor to the reactor of any one or more of the preceding embodiments through the reactant solution inlet; reacting the polycarbonate precursor at the reactor temperature of 160 to 300° C., preferably, 160 to 240° C. and the reactor pressure of 5 to 200 mbar to form a mixed solution comprising a polycarbonate oligomer having a weight average molecular weight that is greater than that of the polycarbonate precursor; withdrawing the mixed solution from the reaction solution outlet; and polymerizing the polycarbonate oligomer to form the polycarbonate.

The above described and other features are exemplified by the following figures, detailed description, and claims.

BRIEF DESCRIPTION OF THE DRAWINGS

The figures are exemplary, non-limiting embodiments, wherein the like elements are numbered alike. Several of the figures are illustrative of the examples, which are not intended to limit the disclosure to the materials, conditions, or process parameters set forth herein.

DETAILED DESCRIPTION

Figure 3:
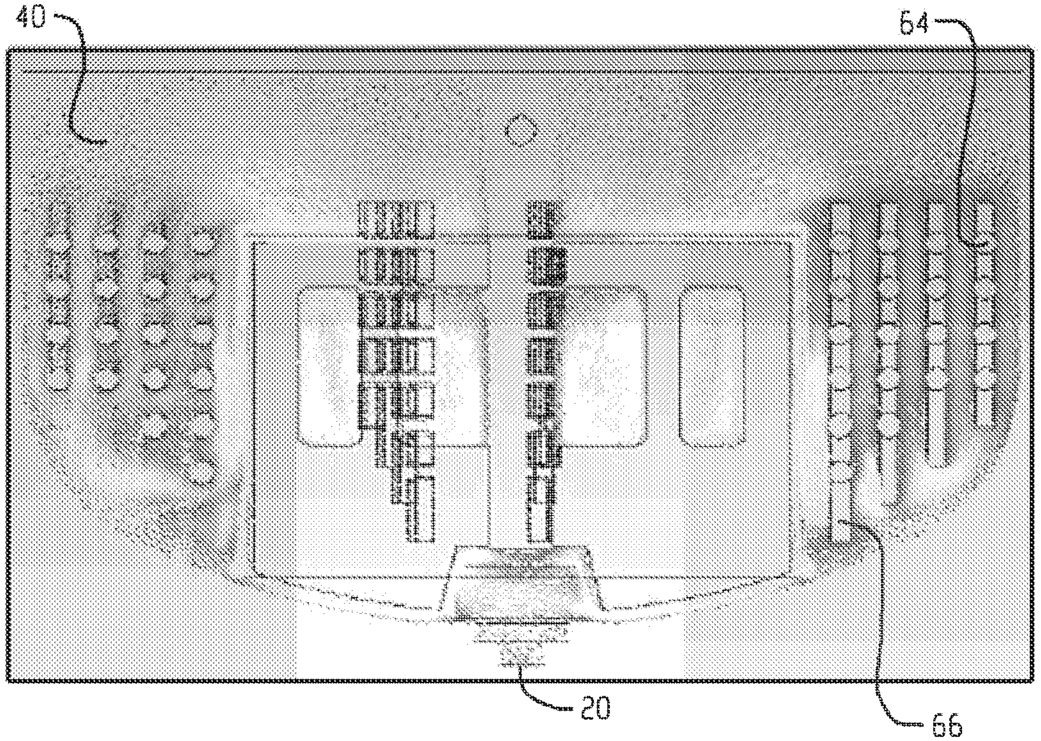
FIG. 3 is an illustration of the computational fluid dynamics evaluation of the side feed reactor of Example 1.
Figure 4:
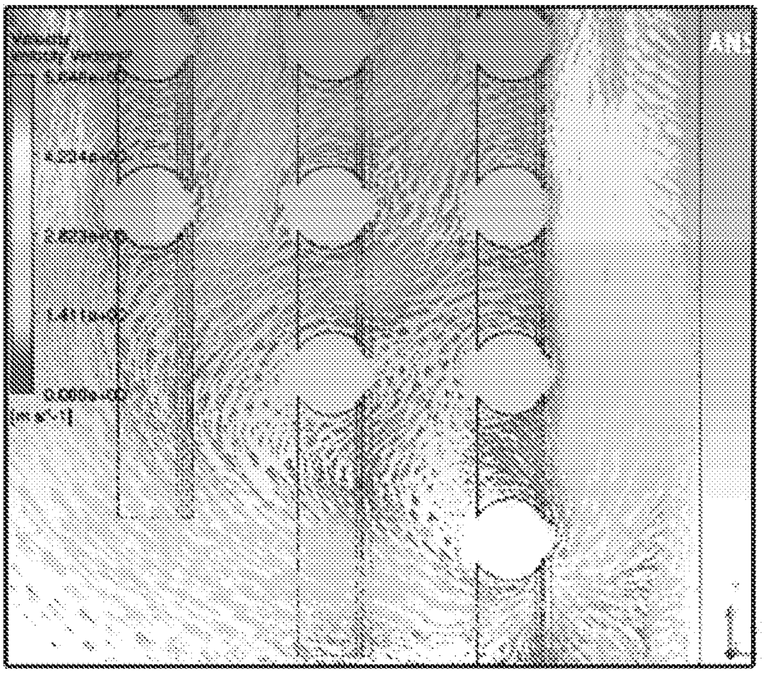
FIG. 4 is a blown up illustration of a portion of FIG. 3.

Melt polymerization is an industrially used process to make polycarbonate by reacting a bisphenol and a carbonate compound in the molten form. The bisphenol and the carbonate compound are added to a monomer mixing tank along with a quaternary catalyst, where some oligomerization starts, as is evidenced by production of a phenol byproduct. From the monomer mixing tank, the melt is added to a series of oligomerization units. When the mixing behavior in these reactors was studied, multiple flow paths were identified in the reactor as shown in FIG. 3 and FIG. 4. In reviewing the flow paths, it was found that the existing location of the inlet, on the side of the cylindrical tank, was not well positioned. Though the inlet and the outlet are located far from each other physically, due to the circulating flow pattern in the reactor, a significant amount of material that enters through the inlet can quickly reach the outlet as shown in FIG. 3. This early exiting of material ultimately resulted in a broad residence time distribution in the reactor.

Figure 6:
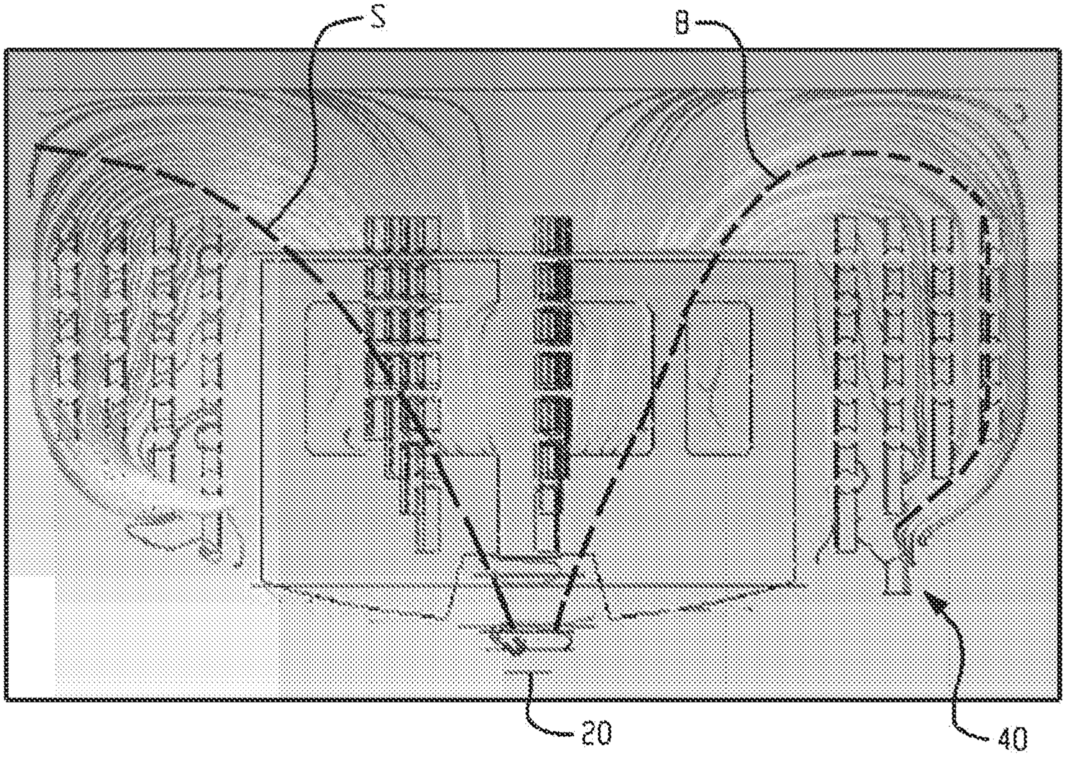
FIG. 6 is an illustration of the computational fluid dynamics evaluation of the bottom feed reactor Example 2 showing an increased path to exit for the solution.

It was surprisingly discovered that early access of the feed material to the reaction solution outlet could be reduced by positioning the reactant solution inlet on the bottom of the tank. In this manner, even though the reactant solution inlet is physically closer to the reaction solution outlet, it is further upstream in the flow pattern, resulting in an increased path length of the feed material to reach the reaction solution outlet (as is illustrated in FIG. 6) ultimately resulting in an improvement (characterized by a reduction in the spread of the distribution) in the residence time distribution in the reactor. It was further surprisingly discovered that by relocating the reactant solution inlet to the bottom of the tank, the channeling of fluid through lower resistant paths that otherwise occurs when the solution viscosity is high, for example, greater than 3 Pascal seconds (Pa·s), could be significantly reduced, ultimately resulting in a further improvement in the residence time distribution. As used herein, the viscosity is determined using a parallel plate rheometer, AR-G2 from TA Instruments, using 25 millimeters (mm) diameter plates having a 0.5 mm gap between the plates. The measurements were made at a temperature of 250 to 300 degrees Celsius (° C.) and varying frequency from 100 and 1,000 inverse seconds ($s^{-1}$). The improved residence time distribution in the reactor may result in a reduction of degradation and discoloration of the resultant polycarbonate.

Figure 1:
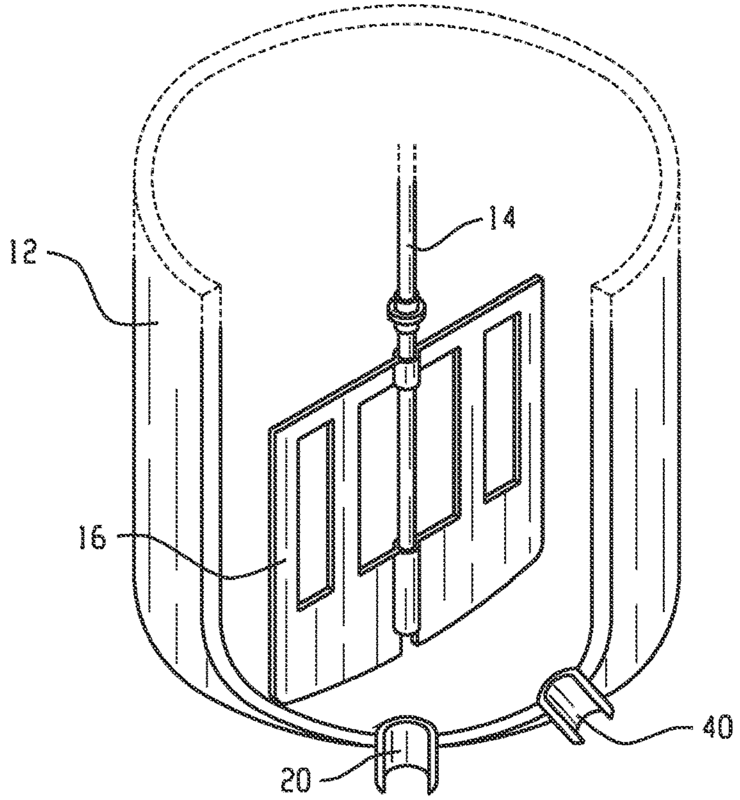
FIG. 1 is an illustration of an embodiment of a bottom feed reactor.
Figure 2:
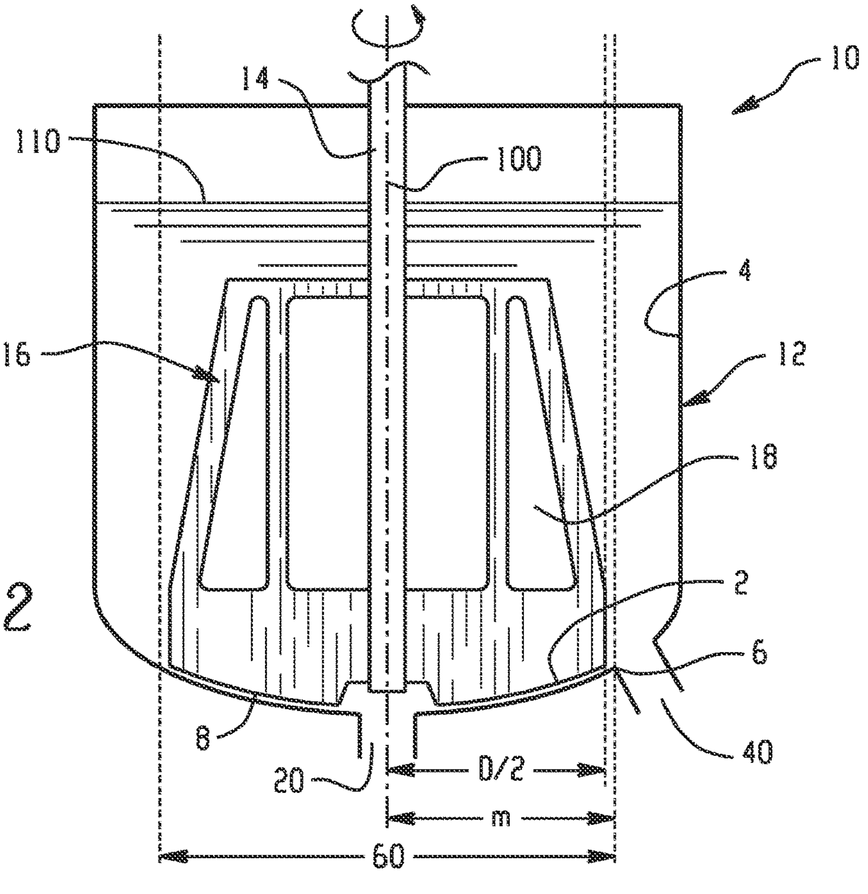
FIG. 2 is an illustration of an embodiment of a bottom feed reactor.

FIG. 1 and FIG. 2 are illustrations of embodiments of the improved, bottom feed reactor 10. FIG. 1 illustrates that reactor 10 can comprise cylindrical tank 12 comprising a top, a side, and a bottom, wherein the bottom is convex, extending away from the top. Stirring shaft 14 is disposed within cylindrical tank 12 along axis 100 thereof so that it is rotatable from outside of cylindrical tank 12. Stirring blade 16 extends from stirring shaft 14 in cylindrical tank 12. Both reactant solution inlet 40 and reaction solution outlet 20 are located on the bottom of cylindrical tank 12. The reactor is a vertical reactor such that axis 100 is perpendicular (within 10°, or 0 to 5°, or 0 to 1°) to at least one of a plane tangent to the bottom of the cylindrical tank or a top fluid plane as defined by a top surface (110) of a resting liquid present in the cylindrical tank.

The shape of the stirring blade is not particularly limited. The stirring blade can comprise a flat plate impeller. The flat plate impeller can be rectangular, square, triangular, trapezoidal, irregular, or the like. The flat plate impeller can have a plurality of openings, for example, openings 18 illustrated in FIG. 2.

The stirring blade can comprise, at least one impeller (for example, a hydrofoil impeller), for example, 1 to 5, or 2 to 4, or 1 to 2 impellers can extend from the stirring shaft. The impeller can comprise 2 to 5 blades, or 2 to 4 blades, or 3 blades. For example, each impeller can be a three-blade impeller.

A total volume of the cylindrical tank can be greater than or equal to 10 meters cubed ($m^3$), or 20 to 100 $m^3$, or 20 to 50 $m^3$. The cylindrical tank can hold greater than or equal to 5,000 liters (L), or 5,000 to 50,000 L, or 5,000 to 15,000 L of liquid. The cylindrical tank can have an inner reactor diameter, $D_T$, of 1 to 10 meters (m), or 2 to 5 m.

A reactant solution inlet is located on the bottom of the cylindrical tank, for example, as illustrated reactant solution inlet 40 in FIG. 1 and FIG. 2. The reactant solution inlet can allow for a polycarbonate precursor solution to be added to the reactor. One or both of additional catalyst and additional monomer can be added to the reactor through the same or through a different inlet that may or may not be located on the bottom of the cylindrical tank. In order to achieve optimum mixing, all of the inlets can be located on the bottom of the cylindrical tank.

The reactant solution inlet can be located outside of a rotation column of the stirring blade. For example, FIG. 2 illustrates that the distance m of inner edge 6 from axis 100 can be greater than or equal to one half of the outer diameter D of lower edge 8 of stirring blade 16 ($m \geq D/2$).

A reaction solution outlet can be located on the side of the cylindrical tank. A reaction solution outlet can be located on the bottom of the cylindrical tank. If located on the bottom of the cylindrical tank, the reaction solution outlet can be concentrically located on a central axis of the cylindrical tank. For example, FIG. 1 and FIG. 2 illustrate reaction solution outlet 20 concentrically located on axis 100 of cylindrical tank 12.

The reactor can comprise a heat exchanger. The heat exchanger can be an internally located heat exchanger that is located inside the cylindrical tank. The heat exchanger can comprise a heating jacket in physical contact with at least a portion of the outside wall of the cylindrical tank. The heat exchanger can comprise an externally located heat exchanger.

If the reactor comprises the internally located heat exchanger, the internally located heat exchanger can comprise one or more internal heating coils located in the cylindrical tank. The internally located heat exchanger can be located in the cylindrical tank at a distance from the axis of greater than half of the outer diameter of the stirring blade at the same height in the cylindrical tank. FIG. 3 is an illustration of a cylindrical reactor that comprises 19 heat exchanger coils 64 on four sets of four supports 66. An inner diameter of each of the circular coils independently can be greater than an outermost diameter of the stirring blade. In other words, a rotation column defined by the rotation of the stirring blade, as illustrated in FIG. 2 as rotation column 60, can be free of heat exchanger coils 64.

If the reactor comprises the externally located heat exchanger, the reactant solution inlet can be in fluid communication with the externally located heat exchanger. For example, a heated stream leaving the externally located heat exchanger can be combined with a solution stream upstream of the reactant solution inlet and added as a combined stream. Conversely, the heated stream can be added to the cylindrical tank through a recirculation inlet that is different from the reactant solution inlet. The recirculation inlet can be located on the top of the cylindrical tank. The recirculation inlet can be located on the side of the cylindrical tank. The recirculation inlet can be located on the bottom of the cylindrical tank.

The reaction solution outlet can be in fluid communication with the externally located heat exchanger. For example, a mixed solution stream exiting the reaction solution outlet can be split (for example, using a Y-junction or a T-junction) into at least two streams, where one of the streams is a recirculation stream that connects to the externally located heat exchanger. Conversely, the recirculation stream can exit the cylindrical tank via a recirculation outlet that is separate from the reaction solution outlet. The recirculation outlet can be located on the side of the cylindrical tank. The recirculation outlet can be located on the bottom of the cylindrical tank.

The cylindrical tank can comprise a reactant solution inlet, a reaction solution outlet, a recirculation inlet, and a recirculation outlet. Both the recirculation inlet and the recirculation outlet can be located on the bottom of the cylindrical tank. The recirculation outlet can be located on the bottom of the cylindrical tank and the recirculation inlet can be located on the side of the cylindrical tank. The cylindrical tank can comprise a reactant solution inlet, a reaction solution outlet, and a recirculation inlet, where the reaction solution outlet is in fluid communication with both a second reactor via a mixed solution stream and the externally located heat exchanger via recirculation stream.

The externally located heat exchanger can comprise 1 or more externally located heat exchangers. When two or more externally located heat exchangers are present, the externally located heat exchangers can be configured in series and/or in parallel with each other. The cylindrical tank can be free of an internally located heat exchanger.

The reactor can be used to prepare a polycarbonate oligomer from a precursor solution. The precursor solution comprising the polycarbonate precursor can be formed in a monomer mixing unit. The monomer mixing unit can be maintained at atmospheric pressure and at a temperature of 100 to 250° C., or 150 to 200° C., or 165 to 185° C. The polycarbonate precursor can comprise a carbonate precursor, a bisphenol, a catalyst, and optionally a low molecular weight oligomer. The bisphenol and the carbonate precursor in the precursor solution can be present in a molar ratio of 0.5:1 to 1.5:1, or 0.9:1 to 1.1:1, or 0.99:1 to 1.01:1.

The method of mixing a precursor solution in the reactor, can comprise adding the precursor solution comprising a polycarbonate precursor to the reactor through a reactant solution inlet located on a bottom side of the cylindrical tank; mixing and polymerizing the polycarbonate precursor at a reactor temperature and a reactor pressure to form a polycarbonate oligomer; and withdrawing a mixed solution comprising the polycarbonate oligomer having a weight average molecular weight that is greater than that of the polycarbonate precursor from a reaction solution outlet. The method can comprise removing a recirculation stream from the cylindrical reactor, flowing the recirculation stream through an externally located heat exchanger to form a heated stream, and reintroducing the heated stream to the cylindrical reactor. The reactor temperature can be 160 to 300° C. or 160 to 280° C., or 160 to 240° C., or 200 to 270° C., or 275 to 300° C. The reactor pressure can be 5 to 200 millibar absolute (mbar), or 30 to 200 mbar, or 2 to 25 mbar. The average residence time of the precursor solution in the reactor can be greater than or equal to a comparison average residence time of the precursor solution added to the same reactor but through a side feeder. The average residence time of the precursor solution in the reactor can be 0.1 to 15 hours.

The mixing can result in the formation of an axial flow pattern, for example, as illustrated in FIG. 6. As used herein, the axial flow pattern refers to the fluid flow flowing in the direction of the stirring shaft towards the bottom of the tank, flowing from the bottom of the tank towards the side of the tank, and flowing upwards along the side of the tank to form a complete circulation loop. A good axial flow pattern can ensure that there are no dead pockets or poorly mixed zones in the reactor and can provide a good volumetric renewal rate to ensure the produced phenol leaves the reactor.

The mixing can occur at a rotation speed of the stirring shaft of 40 to 100 revolutions per minute (rpm). The mixing can achieve a normalized surface refresh rate of greater than or equal to 0.03 inverse seconds ($s^{-1}$), or 0.04 to 0.4 $s^{-1}$, or 0.06 to 0.1 $s^{-1}$. As used herein, the normalized surface refresh rate is the volume of solution that passes across a plane located 200 mm below the liquid surface level per second per total volume of solution in the reactor ($m^3/s \cdot m^3$ or $s^{-1}$). The mixing time can be less than or equal to 60 seconds (s), or 20 to 50 s.

The mixed solution can have a mixed solution viscosity that is greater than a precursor solution viscosity of the precursor solution. For example, the precursor solution can have a precursor solution viscosity that is less than or equal to 0.05 Pa·s and the mixed solution can have a mixed solution viscosity of greater than or equal to 0.05 Pa s, or greater than or equal to 0.5 Pa·s, or 0.05 to 0.5 Pa·s, or greater than or equal to 2.5 Pa·s, or 0.15 to 10 Pas, or 0.5 to 10 Pa·s.

When the bottom feed reactor is used in a melt polycarbonate polymerization plant, it can be used as an oligomerization reactor (also referred to as an oligomeriser). The oligomerization reactor can be in series with two or more oligomerizers. One or more of the oligomerisers can be bottom feed reactors. For example, in a melt polymerization (also referred to herein as a melt transesterification reaction), a reactant solution inlet of a first oligomeriser can be in fluid communication with a monomer mixing tank, the reaction solution outlet of the first oligomeriser can be in fluid communication with a second reactor inlet of a second oligomeriser, and a second reactor outlet of the second oligomeriser can be in fluid communication with a polymerization reactor. At least one of the first oligomeriser or the second oligomeriser can be a bottom feed reactor. For example, the first oligomeriser can be a side feed reactor having two three-blade impellers extending from the stirring shaft and the second oligomeriser can be a bottom feed reactor having a flat plate impeller extending from the stirring shaft. Conversely, both the first oligomeriser and the second oligomeriser can be bottom feed reactors.

The mixed solution can be added to a second reactor and the method can comprise adding the mixed solution to the second reactor via an inlet that can be located on the bottom of the second reactor, mixing and further polymerizing the mixed solution at a second temperature greater than the reactor temperature and a second pressure less than the reactor pressure, and withdrawing an oligomer solution comprising a high molecular weight polycarbonate oligomer having a weight average molecular weight that is greater than that of the polycarbonate oligomer. For example, the high molecular weight polycarbonate oligomer can have a weight average molecular weight of 1.5 to 15 kilodaltons, or 8 to 12 kilodaltons, or 8 to 20 kilodaltons based on polycarbonate standards. The high molecular weight polycarbonate oligomer can have a viscosity of 1 to 10 Pa·s. The high molecular weight polycarbonate oligomer can then be polymerized in one or more polymerization vessels, for example, one or more wire wetting fall polymerization units, horizontal polymerizers, vertical polymerizers, reactive extruders, or a continuously stirred tank.

The second reactor can comprise a second cylindrical tank comprising a second top, a second side, and a second bottom, wherein the second bottom is convex. extending away from the second top; a second stirring shaft disposed within the second cylindrical tank along a second axis thereof so that it is rotatable from outside of the second cylindrical tank; a second stirring blade extending from the second stirring shaft in the second cylindrical tank; a second reactant solution inlet located on the second bottom; and a second reaction solution outlet located on the second bottom. It is noted that the term "second" is used for clarity to distinguish from the "first" reactor and that the term "downstream" could likewise be used.

The first reactor temperature can be 160 to 300° C., or 160 to 275° C., or 160 to 250° C., or 200 to 270° C. or 230 to 270° C. The first reactor pressure can be 50 to 200 mbar, or 75 to 200 mbar. The mixed solution viscosity can be 0.05 to 1 Pa·s, or 0.05 to 0.5 Pa·s. The second reactor temperature can be 250 to 300° C. or 270 to 300° C. The second reactor pressure can be 5 to 50 mbar, or 10 to 40 mbar. The oligomer solution viscosity can be 0.5 to 10 Pa·s, or 1 to 5 Pa·s, or greater than or equal to 1 Pa·s.

The polycarbonate can then be extruded in an extruder where an optional quencher and an additive can be added to the molten polycarbonate. The extruder can be a twin-screw extruder and at least one of the components can be incorporated into the composition by feeding directly into the extruder at the throat and/or downstream of the throat through, for example, a side stuffer.

The carbonate precursor can comprise a diaryl carbonate ester, for example, diphenyl carbonate or an activated diphenyl carbonate having electron-withdrawing substituents on each aryl, for example, at least one of bis(4-nitrophenyl) carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, or bis(4-acetylphenyl) carboxylate. The diaryl carbonate ester can be free of an activated diphenyl carbonate having electron-withdrawing substituents on each aryl. For example, the diaryl carbonate ester can be free of bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, and bis(4-acetylphenyl) carboxylate. The diaryl carbonate ester can be free of bis(methyl salicyl)carbonate.

As used herein, "can be free of" refers to none of the compounds being added in the melt polymerization, for example, less than or equal to 10 ppm, for example, 0 ppm of the compound being present. The carbonate precursor can comprise diphenyl carbonate.

The bisphenol can comprise a dihydroxy compound of the formula HO—$R^1$—OH, wherein the $R^1$ group can contain an aliphatic, an alicyclic, or an aromatic moiety. For example, the bisphenol can have the formula (2)

$$HO\text{-}A^1\text{-}Y^1\text{-}A^2\text{-}OH \quad (2)$$

wherein each of $A^1$ and $A^2$ is a monocyclic divalent aromatic group and $Y^1$ is a single bond or a bridging group having one or more atoms that separate $A^1$ from $A^2$. One atom can separate $A^1$ from $A^2$.

The bisphenol can have the formula (3)

(3)

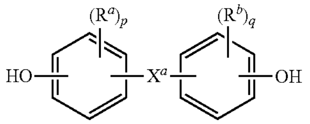

wherein $R^a$ and $R^b$ are each independently a halogen, $C_{1-12}$ alkoxy, or $C_{1-12}$ alkyl; and p and q are each independently integers of 0 to 4. It will be understood that $R^a$ is hydrogen when p is 0, and likewise $R^b$ is hydrogen when q is 0. Also in formula (3), $X^a$ is a bridging group connecting the two hydroxy-substituted aromatic groups, where the bridging group and the hydroxy substituent of each $C_6$ arylene group are disposed ortho, meta, or para (specifically, para) to each other on the $C_6$ arylene group. The bridging group $X^a$ can be single bond, —O—, —S—, —S(O)—, —$S(O)_2$—, —C(O)—, or a $C_{1-18}$ organic bridging group. The $C_{1-18}$ organic bridging group can be cyclic or acyclic, aromatic or non-aromatic, and can further comprise heteroatoms, for example, halogens, oxygen, nitrogen, sulfur, silicon, or phosphorous. The $C_{1-18}$ organic bridging group can be disposed such that the $C_6$ arylene groups connected thereto are each connected to a common alkylidene carbon or to different carbons of the $C_{1-18}$ organic bridging group. p and q can each be 1, and $R^a$ and $R^b$ are each a $C_{1-3}$ alkyl group, specifically, methyl, disposed meta to the hydroxy group on each arylene group.

$X^a$ can be a substituted or unsubstituted $C_{3-18}$ cycloalkylidene, a $C_{1-25}$ alkylidene of formula —$C(R^c)(R^d)$— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —$C(=R^e)$— wherein $R^e$ is a divalent $C_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

$X^a$ can be a $C_{1-18}$ alkylene group, a $C_{3-18}$ cycloalkylene group, a fused $C_{6-18}$ cycloalkylene group, or a group of the formula —$B^1$-G-$B^2$— wherein $B^1$ and $B^2$ are the same or different $C_{1-6}$ alkylene group and G is a $C_{3-12}$ cycloalkylidene group or a $C_{6-16}$ arylene group. For example, $X^a$ can be a substituted $C_{3-18}$ cycloalkylidene of formula (4)

(4)

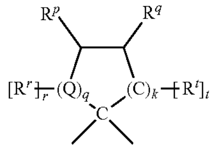

wherein $R^r$, $R^p$, $R^t$, and R are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and q is 0, the ring as shown in formula (4) contains 4 carbon atoms, when k is 2, the ring as shown in formula (4) contains 5 carbon atoms, and when k is 3, the ring contains 6 carbon atoms. Two adjacent groups (e.g., $R^q$ and $R^t$ taken together) can form an aromatic group or $R^q$ and $R^t$ taken together can form one aromatic group and $R^r$ and $R^p$ taken together form a second aromatic group. When $R^q$ and $R^t$ taken together form an aromatic group, $R^p$ can be a double-bonded oxygen atom. i.e., a ketone.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl) cyclohexane (DMBPC). Combinations comprising at least one of the foregoing bisphenols can also be used. The bisphenol can comprise bisphenol A, in which each of $A^1$ and $A^2$ can be p-phenylene, and $Y^1$ can be isopropylidene in formula (3).

The resultant "polycarbonate" as used herein is derived from the carbonate compound and the bisphenol and can have repeating structural carbonate units of formula (1)

(1)

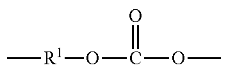

in which the $R^1$ groups contain aliphatic, alicyclic, and/or aromatic moieties (e.g., greater than or equal to 30 percent, specifically, greater than or equal to 60 percent, of the total number of $R^1$ groups can contain aromatic moieties and the balance thereof are aliphatic, alicyclic, or aromatic). Optionally, each $R^1$ can be a $C_{6-30}$ aromatic group that can contain at least one aromatic moiety. $R^1$ can be derived from the bisphenol.

The precursor solution can comprise at least one of a quaternary compound or an alkali catalyst. The precursor solution can comprise a quaternary compound and an alkali catalyst can be added to the reactor as a separate catalyst stream.

The quaternary catalyst comprises at least one of a quaternary ammonium compound or a quaternary phosphonium compound. The quaternary ammonium compound can be a compound of the structure $(R^4)_4N^+X^-$, wherein each $R^4$ is the same or different, and is a $C_{1-20}$ alkyl, a $C_{4-20}$ cycloalkyl, or a $C_{4-20}$ aryl; and $X^-$ is an organic or inorganic anion, for example, a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, and tetrabutyl ammonium acetate.

The quaternary phosphonium compound can be a compound of the structure $(R^5)_4P^+X^-$, wherein each $R^5$ is the same or different, and is a $C_{1-20}$ alkyl, a $C_{4-20}$ cycloalkyl, or a $C_{4-20}$ aryl; and $X^-$ is an organic or inorganic anion, for example, a hydroxide, phenoxide, halide, carboxylate, for example, acetate or formate, sulfonate, sulfate, formate, carbonate, or bicarbonate. Where $X^-$ is a polyvalent anion, for example, carbonate or sulfate, it is understood that the positive and negative charges in the quaternary ammonium and phosphonium structures are properly balanced. For example, where $R^{20}$ to $R^{23}$ are each methyls and $X^-$ is carbonate, it is understood that $X^-$ represents $2(CO_3^{-2})$.

Examples of organic quaternary phosphonium compounds include tetramethyl phosphonium hydroxide, tetramethyl phosphonium acetate, tetramethyl phosphonium formate, tetrabutyl phosphonium hydroxide, tetraethyl phosphonium acetate, tetrapropyl phosphonium acetate, tetrabutyl phosphonium acetate (TBPA), tetrapentyl phosphonium acetate, tetrahexyl phosphonium acetate, tetraheptyl phosphonium acetate, tetraoctyl phosphonium acetate, tetradecyl phosphonium acetate, tetradodecyl phosphonium acetate, tetratolyl phosphonium acetate, tetramethyl phosphonium benzoate, tetraethyl phosphonium benzoate, tetrapropyl phosphonium benzoate, tetraphenyl phosphonium benzoate, tetraethyl phosphonium formate, tetrapropyl phosphonium formate, tetraphenyl phosphonium formate, tetramethyl phosphonium propionate, tetraethyl phosphonium propionate, tetrapropyl phosphonium propionate, tetramethyl phosphonium butyrate, tetraethyl phosphonium butyrate, tetrapropyl phosphonium butyrate, tetraphenyl phosphonium acetate (TPPA), and tetraphenyl phosphonium phenoxide (TPPP). The quaternary catalyst can comprise at least one of tetrabutyl phosphonium acetate, TPPP, or TPPA.

The amount of the quaternary catalyst can be added based upon the total number of moles of bisphenol employed in the polymerization reaction. When referring to the ratio of catalyst, for example, phosphonium salt, to all bisphenols employed in the polymerization reaction, it is convenient to refer to moles of phosphonium salt per mole of the bisphenol (s), meaning the number of moles of phosphonium salt divided by the sum of the moles of each individual bisphenol present in the reaction mixture. The amount of the optional quaternary catalyst (e.g., organic ammonium or phosphonium salts) can each independently be employed in an amount of $1\times10^{-2}$ to $1\times10^{-5}$, or $1\times10^{-3}$ to $1\times10^{-4}$ moles per total mole of the bisphenol(s) in the monomer mixture.

The alkali catalyst comprises a source of one or both of alkali ions and alkaline earth ions. The sources of these ions can include alkaline earth hydroxides, for example, magnesium hydroxide and calcium hydroxide. Sources of alkali metal ions can include the alkali metal hydroxides, for example, at least one of lithium hydroxide, sodium hydroxide, or potassium hydroxide. Examples of alkaline earth metal hydroxides are calcium hydroxide and magnesium hydroxide. The alkali catalyst can comprise sodium hydroxide. Other possible sources of alkaline earth and alkali metal ions include at least one of salts of carboxylic acids (for example, sodium acetate) or derivatives of ethylene diamine tetraacetic acid (EDTA) (for example, EDTA tetrasodium salt and EDTA magnesium disodium salt). For example, the alkali catalyst can comprise at least one of alkali metal salt(s) of a carboxylic acid or alkaline earth metal salt(s) of a carboxylic acid. In another example, the alkali catalyst comprises $Na_2Mg$ EDTA or a salt thereof.

The alkali catalyst can also, or alternatively, comprise salt(s) of a non-volatile inorganic acid. For example, the alkali catalyst can comprise salt(s) of a non-volatile inorganic acid, for example, at least one of $NaH_2PO_3$, $NaH_2PO_4$, $Na_2HPO_3$, $KH_2PO_4$, $CsH_2PO_4$, or $Cs_2HPO_4$. Alternatively, or in addition, the alkali catalyst can comprise mixed alkali metal salt(s) of phosphoric acid, for example, at least one of $NaKHPO_4$, $CsNaHPO_4$, or $CsH_2PO_4$. The alkali catalyst can comprise $KNaHPO_4$, wherein a molar ratio of Na to K is 0.5 to 2.

The alkali catalyst typically can be used in an amount sufficient to provide $1\times10^{-2}$ to $1\times10^{-8}$ moles, or $1\times10^{-4}$ to $1\times10^{-7}$ moles of metal hydroxide per mole of the bisphenol (s).

Quenching of the transesterification catalysts and any reactive catalysts residues with an acidic compound after polymerization can be completed can also be useful in some melt polymerization processes. Among the many quenchers that can be used are alkyl sulfonic esters of the formula $R^8SO_3R^9$ wherein $R^8$ is hydrogen. $C_{1-12}$ alkyl, $C_{6-18}$ aryl, or $C_{7-19}$ alkylaryl, and $R^9$ is $C_{1-12}$ alkyl, $C_{6-18}$ aryl, or $C_{7-19}$ alkylaryl. Examples of quenchers include benzenesulfonate, p-toluenesulfonate, methylbenzene sulfonate, ethylbenzene sulfonate, n-butyl benzenesulfonate, octyl benzenesulfonate and phenyl benzenesulfonate, methyl p-toluenesulfonate, ethyl p-toluenesulfonate, n-butyl p-toluene sulfonate, octyl p-toluenesulfonate, and phenyl p-toluenesulfonate. In particular, the quencher can comprise an alkyl tosylate, for example, n-butyl tosylate.

The following examples are provided to illustrate the bottom feed reactor. The examples are merely illustrative and are not intended to limit devices made in accordance with the disclosure to the materials, conditions, or process parameters set forth therein.

EXAMPLES

Example 1: Flow Evaluation of a Side Feed Reactor

A computational fluid dynamics evaluation of fluid flow in a side feed reactor was performed using ANSYS CFD software. In the evaluation, a reactor as illustrated in FIG. 3 was modelled, where the stirring apparatus was rotated at a rate of 66 revolutions per minute (rpm), the reactor had a volume of 6.88 $m^3$, the solution density was 1,020 kilograms per meter cubed (kg/m), the temperature was 280° C., the mass flow rate was 9,500 kilograms per hour (kg/hr), and the solution viscosity was 2 Pa·s.

Figure 5:
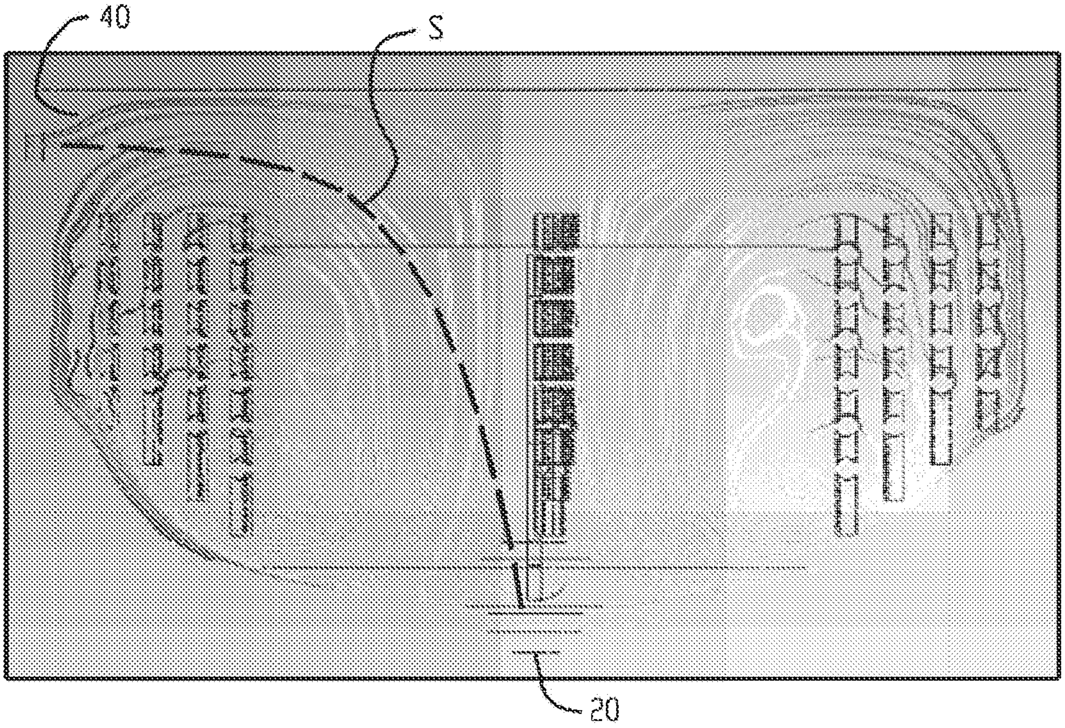
FIG. 5 is an illustration of the computational fluid dynamics evaluation of the side feed reactor Example 1 showing a quick path to exit for the solution.

The resulting flow pattern is shown in FIG. 3, FIG. 4, and FIG. 5, where FIG. 4 is a blown up illustration of the box outlined in FIG. 3. The figures illustrate that the channeling of fluid through lower resistant paths was significant when the solution viscosity was high. FIG. 5 further illustrates that, although the reactant solution inlet 40 and the reaction solution outlet 20 of the tank are located at an increased distance from one another, being across the tank, the viscous solution that enters through the inlet can quickly reach the reaction solution outlet 20 along the path of the dotted line, S, which can ultimately result in a broad residence time distribution of the solution in the reactor.

Example 2: Flow Evaluation of a Bottom Feed Reactor

A computational flow dynamics evaluation was performed in accordance with Example 1, except that the reactant solution inlet was located at the bottom of the reactor.

The resulting flow pattern is shown in FIG. 6. FIG. 6 illustrates that the overall flow path of the solution entering from a bottom feed is increased, for example, along dotted line, B, as compared to dotted line S, which is merely illustrated in FIG. 6 for comparative purposes. This increased flow path results in an increased residence time in the reactor for some early leaving fluid elements.

Example 3-5: Residence Time Evaluation

Residence time evaluations were performed, where, after steady state was achieved, a tracer was injected upstream of the reactor and the concentration of the tracer in a line downstream of the reactor was determined with time. In Example 3, the simulation was performed in accordance with the side feed reactor of Example 1. In Example 4, the simulation was performed in accordance with the side feed reactor of Example 3 except the viscosity of the solution was increased to 3.2 Pa·s. In Example 5, the simulation was performed in accordance with the bottom feed reactor of Example 2, except the viscosity of the solution was increased to 3.2 Pa·s. The concentration profiles were then compared to that of an ideal continuously stirred tank (CSTR). The results are illustrated in FIG. 7.

Figure 7:
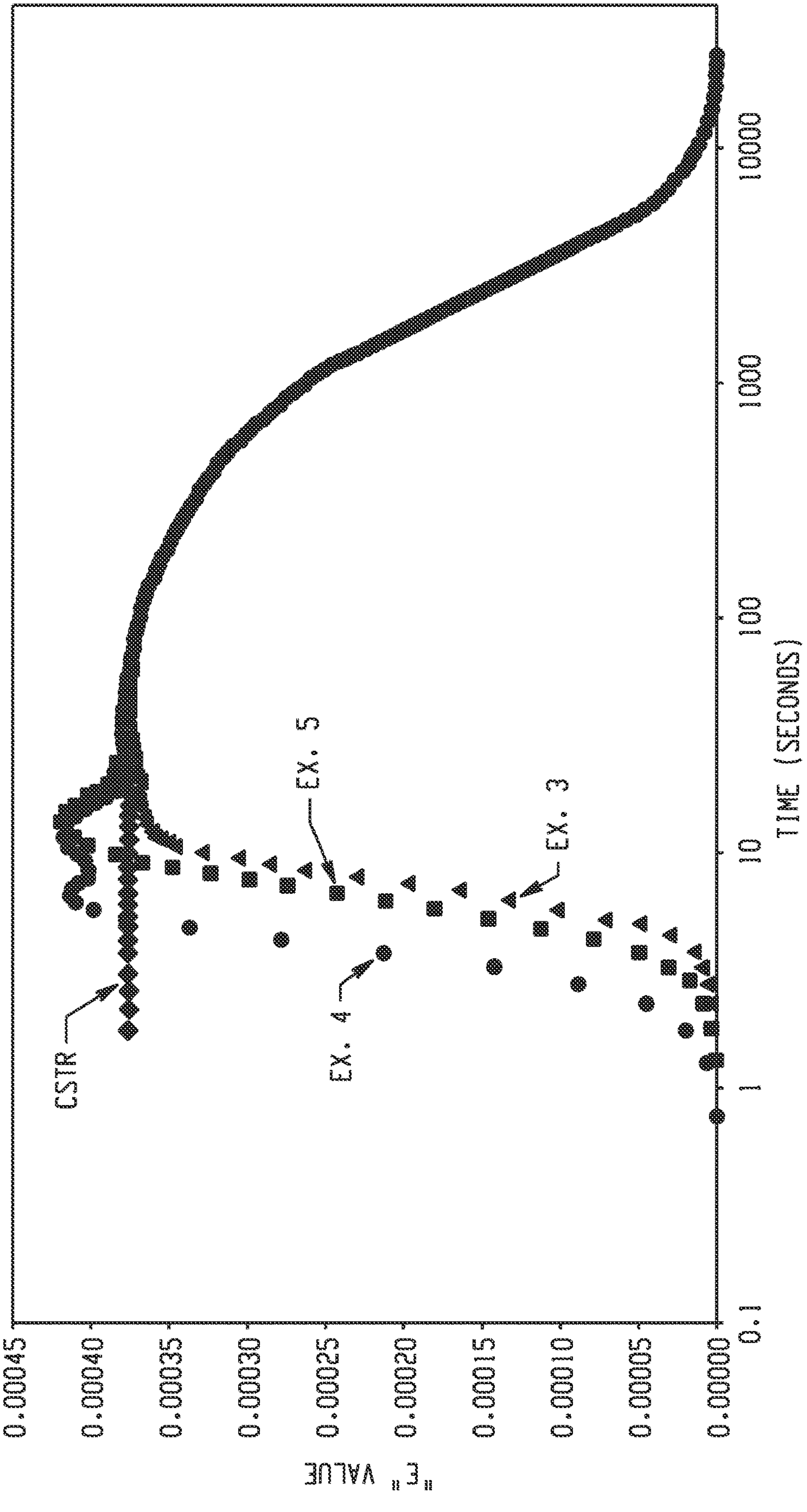
FIG. 7 is a graphical illustration of the residence time profile of Examples 3-5.

FIG. 7 shows that the side feed reactor of Example 3 at a viscosity of 2 Pa·s, achieves almost ideal mixing. When the viscosity is increased to 3.2 Pa·s, as in Example 4, two peaks in the residence time evaluation at early times are observed, indicating the formation of shorter flow paths in the reactor. Surprisingly, merely by utilizing a bottom feed reactor, the residence time in the reactor of the more viscous solution was increased, where FIG. 7 clearly shows the delayed peak formation as of Example 5 as compared to Example 4. FIG. 7 further shows that Example 5 displayed a single peak as compared to the double peak of Example 4. The presence of only a single peak in Example 5 indicates that the formation of a shorter flow path to exit was beneficially avoided. These results clearly indicate that using the bottom feed reactor, a longer residence time in the reactor is achieved for some early leaving fluid elements. When used therefore in an oligomerization reaction, the longer residence time can ultimately result in an increased reaction time for the reactants in the reactor, potentially allowing for the increased higher molecular weight with a reduced polydispersity.

Set forth below are non-limiting embodiments of the present disclosure.

Embodiment 1: A reactor for carrying out a melt transesterification reaction at a reactor temperature of 160 to 300° C. and a reactor pressure of 5 to 200 mbar, comprising: a cylindrical tank comprising a top, a side, and a bottom, wherein the bottom is convex, extending away from the top; a stirring shaft disposed within the cylindrical tank along an axis thereof so that it is rotatable from outside of the cylindrical tank; a stirring blade extending from the stirring shaft in the cylindrical tank; a reactant solution inlet located on the bottom; and a reaction solution outlet located on the bottom. The reactor is a vertical reactor where the axis of the stirring shaft is perpendicular (i.e. within 10°, or 0 to 50, or 0 to 1°) to at least one of a plane tangent to the bottom of the cylindrical tank or a top fluid plane as defined by a top surface of a resting liquid present in the cylindrical tank.

Embodiment 2: The reactor of Embodiment 1, wherein the reaction solution outlet is concentrically located on the axis of the cylindrical tank.

Embodiment 3: The reactor of any one or more of the preceding embodiments, wherein the stirring blade comprises a flat plate impeller optionally having a plurality of openings.

Embodiment 4: The reactor of any one or more of the preceding embodiments, wherein the stirring blade comprises a three-blade impeller.

Embodiment 5: A method of melt polymerizing a polycarbonate, comprising: adding a precursor solution comprising a polycarbonate precursor to the reactor of any one or more of the preceding embodiments through the reactant solution inlet; reacting the polycarbonate precursor at the reactor temperature of 160 to 300° C., preferably, 160 to 240° C. and the reactor pressure of 5 to 200 mbar to form a mixed solution comprising a polycarbonate oligomer having a weight average molecular weight that is greater than that of the polycarbonate precursor; withdrawing the mixed solution from the reaction solution outlet; and polymerizing the polycarbonate oligomer to form the polycarbonate.

Embodiment 6: The method of Embodiment 5, wherein the mixed solution has a mixed solution viscosity of 0.15 to 10 Pa s.

Embodiment 7: The method of any one or more of Embodiments 5 to 6, wherein the mixed solution has a mixed solution viscosity that is greater than a precursor solution viscosity of the precursor solution.

Embodiment 8: The method of any one or more of Embodiments 5 to 7, wherein an average residence time of the precursor solution in the reactor is greater than a comparison average residence time of the precursor solution added to a corresponding reactor that is the same as the reactor but that adds the precursor solution through a side feeder, preferably, the residence time is 0.1 to 15 hours.

Embodiment 9: The method of any one or more of Embodiments 5 to 8, further comprising adding a catalyst to the reactor.

Embodiment 10: The method of any one or more of Embodiments 5 to 9, further comprising, prior to the polymerizing, directing the mixed solution into a second reactor of any one or more of Embodiments 1 to 4; mixing the mixed solution at a second temperature greater than the reactor temperature and a second pressure less than the reactor pressure; and withdrawing an oligomer solution comprising a high molecular weight polycarbonate oligomer having a weight average molecular weight that is greater than that of the polycarbonate oligomer from the reaction solution outlet.

Embodiment 11: The method of Embodiment 10, wherein the high molecular weight polycarbonate oligomer has a weight average molecular weight of 1.5 to 15 kilodaltons based on polycarbonate standards.

Embodiment 12: The method of any one or more of Embodiments 5 to 11, wherein the precursor solution comprises bisphenol A and diphenyl carbonate.

Embodiment 13: A method of melt polymerizing a polycarbonate, comprising: adding a carbonate precursor, a bisphenol, and a quaternary catalyst to a monomer mixing tank to form a precursor solution; adding the precursor solution to a first oligomeriser and mixing and polymerizing the polycarbonate precursor in the rust oligomeriser at a first reactor temperature of 200 to 270° C., preferably, 245 to 265° C., and a first reactor pressure of 50 to 200 mbar to form a polycarbonate oligomer having a first viscosity of 0.05 to 0.5 Pa·s; withdrawing a mixed solution from the first oligomeriser comprising the polycarbonate oligomer having a weight average molecular weight that is greater than that of the polycarbonate precursor from the reaction solution outlet; directing the mixed solution into a second oligomeriser and mixing the mixed solution at a second temperature of 275 to 300° C. and a second pressure of 2 to 25 mbar; withdrawing an oligomer solution comprising a high molecular weight polycarbonate oligomer having a weight average molecular weight of 8 to 20 kilodaltons based on polystyrene standards and a viscosity of greater than or equal to 1 Pa·s; and directing the high molecular weight polycarbonate oligomer to a series of polymerization vessels; wherein at least of the first oligomeriser and the second oligomeriser are described by the reactor of any one or more of Embodiments 1 to 4.

Embodiment 14: The method of Embodiment 15, wherein the first oligomeriser and the second oligomeriser are described by the reactor of any one or more of Embodiments 1 to 4.

Embodiment 15: The method of Embodiment 15, wherein the first oligomeriser is a side feed oligomeriser and the second oligomeriser is described by the reactor of any one or more of Embodiments 1 to 9; wherein the first oligomeriser has two three-blade impellers extending from the stirring shaft and the second oligomeriser has a flat plate impeller extending from the stirring shaft.

Embodiment 16: Use of the reactor of any one or more of Embodiments 1 to 4 in polymerizing a polycarbonate oligomer.

Embodiment 17: The reactor of any one or more of further comprising a controller configured to control at least one of a flow rate, a pressure, or a temperature in the reactor.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced items. The term "or" means "and/or" unless clearly indicated otherwise by context. Reference throughout the specification to "an embodiment", "another embodiment", "some embodiments". "an aspect", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments. "Optional" or "optionally" means that the subsequently described event or circumstance may or may not occur, and that the description includes instances where the event occurs and instances where it does not. The term "combination" is inclusive of blends, mixtures, alloys, reaction products, and the like. The suffix "(s)" as used herein is intended to include both the singular and the plural of the term that it modifies, thereby including one or more of that term (e.g., the colorant(s) includes one or more colorants). Unless specifically stated, the terms "first," "second," and the like, "primary," "secondary," and the like, as used herein do not denote any order, quantity, or importance, but rather are used to distinguish one element from another. Also, "at least one of" means that the list is inclusive of each element individually, as well as combinations of two or more elements of the list, and combinations of at least one element of the list with like elements not named.

In general, the compositions, methods, and articles can alternatively comprise, consist of, or consist essentially of, any ingredients, steps, or components herein disclosed. The compositions, methods, and articles can additionally, or alternatively, be formulated, conducted, or manufactured so as to be devoid, or substantially free, of any ingredients, steps, or components not necessary to the achievement of the function or objectives of the present claims.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," for example, 10 to 23 wt %, etc.

Unless defined otherwise, technical and scientific terms used herein have the same meaning as is commonly understood by one of skill in the art to which this invention belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A reactor (10) for carrying out a melt transesterification reaction at a reactor temperature of 160 to 300° C. and a reactor pressure of 5 to 200 mbar, comprising:

a cylindrical tank (12) comprising a top, a side, and a bottom, wherein the bottom is convex, extending away from the top;

a stirring shaft (14) disposed within the cylindrical tank (12) along an axis (100) thereof so that it is rotatable from outside of the cylindrical tank (12);

a stirring blade (16) extending from the stirring shaft (14) in the cylindrical tank (12);

a reactant solution inlet (40) located on the bottom; and a reaction solution outlet (20) located on the bottom, wherein the stirring blade comprises a flat plate impeller, wherein the stirring shaft (14) is disposed from the top of the cylindrical tank (12) along the axis (100) thereof, wherein the reactant solution inlet (40) is located on the bottom at a location outside of a rotation column of the stirring blade (16), and wherein the reaction solution outlet (20) is concentrically located on the axis (100) of the cylindrical tank (12).

2. The reactor of claim 1, wherein the flat plate impeller has a plurality of openings (18).

3. The reactor of claim 1, wherein the stirring blade (16) comprises a three-blade impeller.

4. The reactor of claim 1, further comprising a plurality of heating coils (64) located in the cylindrical tank (12).

5. The reactor of claim 4, further comprising a plurality of supports (66) in the cylindrical tank (12), the plurality of supports (66) supporting the plurality of heating coils (64).

6. A reactor (10) for carrying out a melt transesterification reaction at a reactor temperature of 160 to 300° C. and a reactor pressure of 5 to 200 mbar, comprising:

a cylindrical tank (12) comprising a top, a side, and a bottom, wherein the bottom is convex, extending away from the top;

a stirring shaft (14) disposed within the cylindrical tank (12) along an axis (100) thereof so that it is rotatable from outside of the cylindrical tank (12);

a stirring blade (16) extending from the stirring shaft (14) in the cylindrical tank (12);

a reactant solution inlet (40) located on the bottom at a location outside of a rotation column of the stirring blade (16); and a reaction solution outlet (20) located on the bottom; and a plurality of heating coils (64) located in the cylindrical tank (12), wherein the stirring blade comprises a flat plate impeller.

7. The reactor of claim 6, further comprising a plurality of supports (66) in the cylindrical tank (12), the plurality of supports (66) supporting the plurality of heating coils (64).

* * * * *